Figure 1:
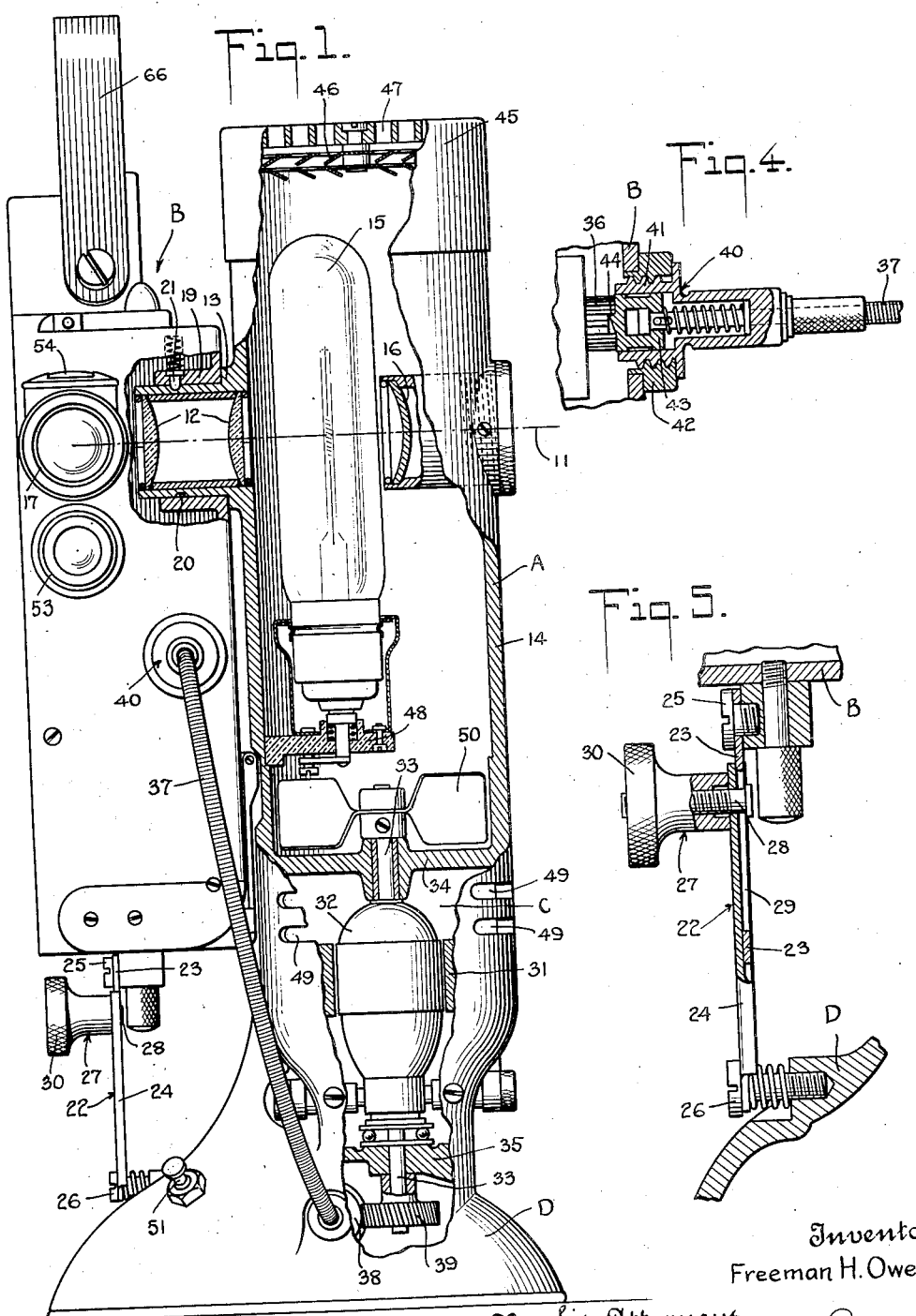

July 25, 1933.　　　　　F. H. OWENS　　　　　1,919,595
PROJECTION MACHINE
Filed April 4, 1928　　　2 Sheets-Sheet 1

Inventor
Freeman H. Owens
By his Attorneys
Cavanagh & James

July 25, 1933.　　　F. H. OWENS　　　1,919,595
PROJECTION MACHINE
Filed April 4, 1928　　　2 Sheets-Sheet 2

Inventor
Freeman H. Owens
By his Attorneys

Patented July 25, 1933

1,919,595

UNITED STATES PATENT OFFICE

FREEMAN H. OWENS, OF NEW YORK, N. Y.

PROJECTION MACHINE

Application filed April 4, 1929. Serial No. 357,157.

This invention relates to a projection machine and has special reference to the provision of improvements to a combined lamp housing and motion picture projection apparatus.

A prime desideratum of my present invention centers about the provision of a motion picture projecting apparatus embodying a constructional and operational design especially suited for portable use. In accomplishing this object, the projection machine of my invention embodies a combined lamp housing and picture projecting apparatus so relatively arranged and organized as to produce a resulting lightweight and compact assembly adaptable to be readily boxed in small confines and to serve for portable use as an advertising or home projector.

A further prime object of my present invention relates to the provision of a combined lamp housing and motion picture projecting apparatus in which the operative mechanism of the motion picture projecting apparatus is adapted to be driven by a motor forming part of the projection machine, the organization of the parts being such as to permit the maintenance of a drive connection between the motor and the motion picture projecting mechanism during a shifting of the angle of projection and at a variety of projecting angles of said motion picture apparatus. A corollary object of the invention is directed to the provision of a combined lamp housing and motion picture projecting apparatus of this nature in which the lamp housing and motor support are stationarily mounted and the projecting apparatus mounted for movement relatively to the said lamp housing and motor support, the arrangement being moreover such as to produce a stable and sturdy assembly.

It is also a further principal object of my present invention to so combine a picture projecting apparatus with a lamp housing as to render it unnecessary to adjust the lamp housing or the optical illumination system thereof during tilting adjustment of the picture projecting apparatus when it is desired to change or vary the angle of picture projection; and in accomplishing this object of the invention the optical systems of the lamp housing and the projection apparatus are so interrelated as to permit the fixing of the optical axis of illumination and the movement relatively to this fixed axis of the optical axis of picture projection.

Other principal objects of my present invention include the provision of a picture projecting machine embodying a motion picture apparatus utilizable also as a camera, which motion picture apparatus is removably mounted with respect to or on the lamp housing; the still further provision of a projecting machine of this nature in which the removably mounted projector is tiltably carried on the lamp housing for adjustment of the angle of projection, the construction embodying a driving means for the operating mechanism of the motion picture apparatus which permits both the removability and the tiltability of the projecting apparatus.

Figure 2:
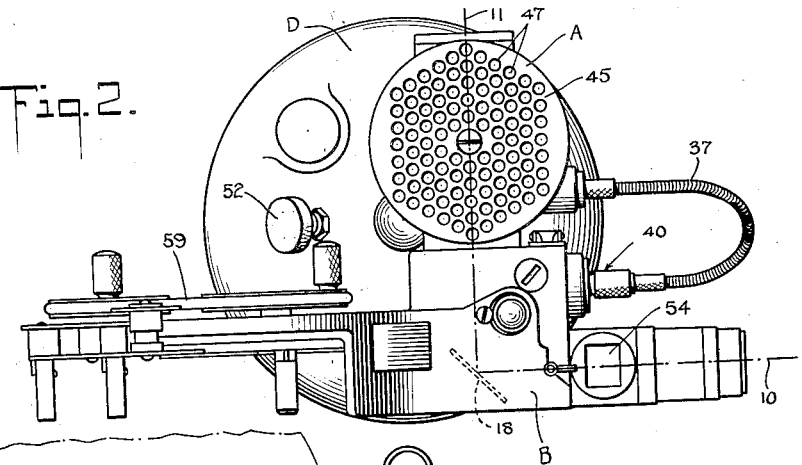
Figure 3:
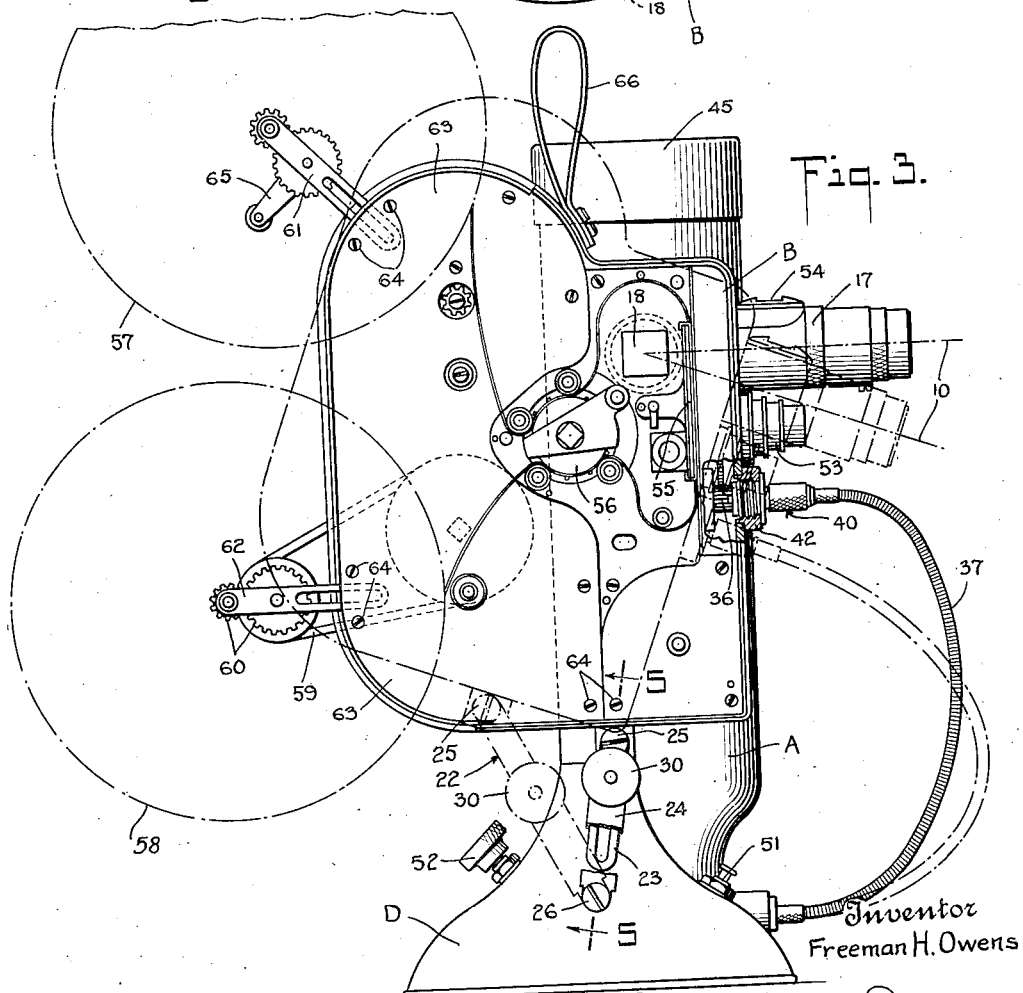

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiment of my invention, and in which:

Fig. 1 is a vertical elevational view of the projecting machine of my invention with parts shown in section and other parts broken away, Fig. 2 is a top plan elevational view thereof, Fig. 3 is a side elevational view thereof with parts shown in section, and Figs. 4 and 5 are fragmentary views of details thereof, Fig. 5 being taken in cross section in the plane of the line 5—5, Fig. 3.

Referring now more in detail to the drawings, my invention is shown to comprise a lamp housing generally designated as A and a picture projecting machine generally designated as B mounted for movement relatively to the lamp housing A and tiltably movable for adjusting the angle of projection, as depicted by the full and dotted lines shown in Fig. 3 of the drawings. The operating mechanism for the projecting machine B is driven or operated by a motor generally designated as C mounted in the lamp housing A or in the base or stand generally designated as D to which the lamp housing A is fixed, said motor C being connected to the picture projecting apparatus B in a manner to permit the relative movement between the projecting apparatus and the lamp housing.

In the preferred construction of the invention the projecting apparatus B is mounted on and supported by the lamp housing A, the projecting apparatus B being so movable relatively to the lamp housing A as to permit the fixing of the optical axis of the illumination system of said lamp housing. To accomplish the desired objects of the invention, the mounting of the projecting apparatus B is such that the axis of picture projection designated by the dot-dash line 10 (see Figs. 2 and 3) is movable over a wide angular range for shifting the angle of projection without necessitating any change in movement in the optical axis of the illuminating system, this being produced by making the movement of the projection axis of the projector take place about the axis of the optical illumination system, such axis being designated by the dot-dash line 11, as shown in Figs. 1 and 2 of the drawings. In the specific embodiment of the invention, the lamp housing A includes an optical system consisting of the condenser lenses 12 arranged in a condenser lens mounting 13 which may form an integral part of the casing 14 of the lamp housing, a lamp 15 as the source of illumination and an adjustable focusing reflecting device generally designated as 16 removably mounted in the casing 14 of the lamp housing, these components of the illumination system being arranged in the optical axis 11. The picture projecting apparatus B correspondingly embodies the usual projection lens system 17, the optical axis 10 of which is arranged to intersect the illumination axis 11, the arrangement being furthermore such that the plane generated by the movement of the projection axis 10 is normal to the illumination axis 11. At the intersection of these axes I locate or arrange the reflector 18, which reflector is mounted in the projector B for movement therewith, this reflector serving the obvious purpose of changing the direction of the illumination axis 11 to one coincident with the variable projection axis 10.

The projection apparatus B is preferably a combined camera and motion picture projector and will be described further in detail hereinafter; and when used as a camera is intended to be removed from the lamp housing A. The projector B is therefore made removably attachable to the lamp housing A, a very convenient form of attachment being made by utilizing the condenser mounting 13 as the tiltable support for the projector B, the said projector being provided with a sleeve or hub 19 which may be formed integral with the projector casing, which sleeve fits over and is received by the condenser lens mounting 13. The mounting 13 is preferably provided with an annular groove 20 in which rides the spring pressed plunger 21 mounted in the sleeve 19, this being provided for preventing accidental removal or dislocation of the projecting apparatus B.

For fixing or locking the projector B in any adjusted position I provide a connecting means generally designated as 22 which connects the lower part of the projector B with the base D of the assembly, said connecting means preferably comprising a pair of telescoping or relatively slidable link members 23 and 24 pivotally attached by means of the pivot pins 25 and 26 respectively to the projecting apparatus B and base D respectively, said link members being secured or locked together in any position of adjustment of the projector by means of the lock nut 27 which embodies a screw element 28 fixed to the link member 24 and having a head slidable in an elongated aperture 29 in the link member 23, the said screw 28 carrying a thumb nut 30.

With the construction thus far recited, it will be seen that the combined camera and projector B may be readily removed from or mounted on the lamp housing A by the ready manipulation of the locking means 27 and by slipping the casing of the projector B on to or off the condenser mounting of the lamp housing. It will be also evident that angular adjustment of the projector may be had with a fixed axis illumination system, this permitting the rugged and stationary mounting of the lamp housing and enabling the stable mounting of the projecting apparatus on the stationary lamp housing. It will be seen, moreover, that the arrangement affords the possibility of assembling the illumination system and the projection apparatus transversely one with respect to the other, and results in the production of a compact and very portable assembly. It is to be noted, moreover, that the projector B is mounted to move about an axis above the center of gravity thereof and locked by means located below the center of gravity thereof, this yielding a very easily or lightly tiltable construction, the facile tilting of which is assisted by confining the weight and bulk of removable parts to the projector per se and thus reducing the same to a substantial minimum.

As heretofore mentioned, the operating mechanism of the projector B is adapted to be driven by the motor C, which in accordance with my present invention is mounted in the base of the lamp housing A. The said motor comprises a field 31 and an armature 32, the shaft 33 of which is journaled in horizontal supports 34 and 35 provided in the lamp housing or casing. This motor C is connected to a pinion or gear 36 of the projector B, which pinion forms the drive pinion for all of the operating mechanism of the picture projector, some of which is disclosed herein and all of which is more particularly described and claimed in my Patents No. 1,833,371, issued Nov. 24, 1931, and No. 1,856,583, issued May 3, 1932, the connection between the motor C and the drive pinion 36 being such as to permit the tiltability and removability of the projector B. To accomplish the desired end I provide a flexible drive element 37 connecting the motor with the drive pinion 36, said flexible drive or shaft 37 being fixed at one end to a shaft carrying a pinion 38 meshing with a pinion 39 attached to the bottom end of the motor shaft 33 and being removably attachable at its other end to the projector B by means of a coupling device 40. The coupling device 40 comprises more specifically a screw threaded element 41 receivable by a correspondingly threaded element or socket 42 forming part of the projector casing, the screw threaded element 41 containing a spring pressed clutch member 43 which mates with a clutch face 44 of the drive pinion 36 when the coupling device 40 is screwed into its socket 42.

It will now be apparent that the motor C which assists in weighting and thus rendering stable the combined apparatus or assembly may be held stationary while the projecting apparatus is moved to adjust the angle of projection, and that moreover, the projecting apparatus may thus be readily dissociated from the driving motor when the same is to be used as a camera. This separation of the motor from the motion picture projecting mechanism is also an important factor in minimizing the weight and bulk of the movable projector parts.

The lamp housing A may receive any suitable design and preferably the same is given an elongated cylindrical contour formed into the casing 14, said casing having a removable top or cap 45 which latter is provided with the usual baffle plates 46 and the ventilation openings 47. The lamp 15 may be mounted in any suitable socket such as 48. For securing a further ventilation in the lamp housing, the casing 14 is provided at its bottom with the ventilating openings 49, the circulation of air being assisted by a fan 50 which is fixed to the top end of the motor shaft 33. For controlling the source of light and the operation of the motor, the base D is provided with a lamp switch 51 and the motor button 52.

The camera and picture projecting apparatus B is shown and described more in detail in my aforesaid Patent No. 1,856,583, issued May 3, 1932, the same being shown herein as including a camera lens system 53 located below the projection lens mount 17, the latter being utilizable to support a finding lens and mirror system when the projector is used as a camera, the projecting lens mount 17 being for this purpose then provided with a view-finding lens and mirror system generally designated 54. The film driving mechanism includes means (not shown) for driving the film through a film gate 55, a common sprocket wheel 56 being employed for feeding the film from a supply reel 57 onto a take-up reel 58, the latter being driven by the belt and pulley means generally designated as 59, receiving movement from the driving elements of the projector, the meshing pinions 60 being connected to be operated by the means 59. Both reels are supported on narrow, elongated bars 61 and 62 which are adjustably and removably mounted in the casing of the projector between a plate 63 and the casing proper of the projector, said plate being secured to the casing by means of a series of screws 34, 64. The reel 57 may be provided with the hand-operated rewinding means 65. The projector casing may, if desired, be also provided with a hand strap 66.

The operation of the projection machine of my present invention and the many advantages thereof will, in the main, be fully apparent from the above detailed description thereof. It will be further apparent that while I have shown and described my invention in the preferred form, many changes and modifications may be made in the structure disclosed without departing from the spirit of the invention, defined in the following claims.

I claim:

1. Motion picture equipment comprising, in combination, a relatively heavy stationary lamp housing containing an optical illumination system and having a large base for stability, and a combined motion picture camera and projecting apparatus detachably and oscillatably mounted on said lamp housing and including an optical projection system illuminated by the said illumination system, and shutter and film moving mechanism, the said optical illumination system having a fixed axis and the said optical projection system having an axis which always intersects the said fixed axis of the illumination system while being movable with the said combined camera and projecting apparatus in order to change the angle of picture projection, and a reflector at the intersecting axes.

2. Motion picture equipment comprising, in combination, a relatively heavy stationary lamp housing having an optical illumination system including a lamp and a plurality of condenser lenses supported in a tubular boss projecting from the lamp housing, and a combined motion picture camera and projection apparatus detachably and tiltably mounted on said boss and having an optical projection system and film moving mechanism, the said optical illumination system having a fixed axis and the said optical projection system having an axis which is tiltable with the said combined apparatus about an axis coincident with said fixed axis to change the angle of picture projection, and a reflector at the intersection of said axes.

3. Motion picture equipment comprising, in combination, a relatively heavy stationarily mounted lamp housing, and a relatively light and portable combined motion picture camera and projecting apparatus illuminated from and mounted on and detachably carried as a unit by said lamp housing when the apparatus is used as a projector, said combined camera and projecting apparatus including film moving mechanism and being oscillatably movable as a unit relatively to the lamp housing for adjusting the angle of picture projection.

4. Motion picture equipment comprising, in combination, a relatively heavy stationary supporting stand, a lamp housing fixed to said stand, and a relatively light and portable combined motion picture camera and projecting apparatus illuminated from and oscillatably and detachably mounted on said lamp housing and stand, said apparatus comprising an optical projection system, a camera lens system, and shutter and film moving mechanism associated with said lens system, and means for adjusting said combined camera and projecting apparatus as a unit relatively to said lamp housing when said apparatus is mounted for projector use on said lamp housing in order to change the direction of picture projection.

5. Motion picture equipment comprising, in combination, a stationary supporting base, a lamp housing fixed to said base, an optical illumination system in said housing, a tubular boss projecting horizontally from said lamp housing with its axis coincident with that of the illumination system, and a combined motion picture camera and projecting apparatus illuminated by said illumination system and tiltably and detachably mounted on said tubular boss, said combined apparatus comprising an optical projection system and shutter and film moving mechanism, and being tiltable as a unit about an axis located a substantial distance above the center of gravity of said apparatus.

6. Motion picture equipment comprising, in combination, a stationary supporting base, a lamp housing fixed to said base, and a combined motion picture camera and projecting apparatus illuminated from and carried by but detachable from said lamp housing and tiltable thereon to adjust the angle of picture projection, and means connecting the apparatus with the base operative for locking the apparatus in any desired adjusted position.

7. Motion picture equipment comprising, in combination, a relatively stationary lamp housing, a motor mounted in said lamp housing, a combined motion picture camera and projecting apparatus illuminated from said lamp housing and mounted externally of the lamp housing for movement relatively to said lamp housing, and a flexible drive connecting said motor with said combined motion picture camera and projecting apparatus in order to drive the latter.

8. Motion picture equipment comprising, in combination, a stationary base or support, a lamp housing fixed to said support, a motor mounted on said support, a combined motion picture camera and projecting apparatus illuminated from said lamp housing and detachably supported externally of the lamp housing for movement relatively to said lamp housing to change the angle of picture projection, and a flexible drive connecting said motor with said combined motion picture camera and projecting apparatus in order to drive the latter when it is used as a projector.

9. Motion picture equipment comprising, in combination, a relatively stationary lamp housing, a motor mounted in said lamp housing, a lamp house ventilating fan driven by said motor, a combined motion picture camera and projecting apparatus illuminated from and detachably mounted externally of the lamp housing for movement relatively to said lamp housing, and a flexible drive connecting said motor with said combined motion picture camera and projecting apparatus in order to drive the latter when it is used as a projector.

10. Motion picture equipment comprising, in combination, a relatively stationary lamp housing having an optical illumination system, a motor in said lamp housing, a combined motion picture camera and projecting apparatus having an optical projection system the axis of which intersects the axis of the optical illumination system, said combined apparatus being mounted on said lamp housing externally thereof and movable about the axis of said optical illumination system, means for adjusting said combined motion picture camera and projecting apparatus about said axis to change the angle of picture projection, and a flexible drive connecting said motor with said combined motion picture camera and projecting apparatus in order to drive the latter.

11. Motion picture equipment comprising, in combination, a relatively stationary lamp housing having a condenser lens system and a mounting therefor, a motor in said lamp housing, a ventilating fan attached to the shaft of said motor, a combined motion picture camera and projecting apparatus having an optical projection system the axis of which intersects the axis of the condenser lens system, and which is illuminated by light projected through said condenser lens system, said combined apparatus being detachably mounted on said condenser lens mounting, means for tiltably adjusting said combined apparatus about said mounting to change the angle of picture projection, and a flexible drive connecting said motor with said combined apparatus in order to drive the latter when it is used as a projector.

12. Motion picture equipment comprising, in combination, a base, a lamp housing fixed to said base, a motor in said lamp housing, a combined motion picture camera and projecting apparatus illuminated from said lamp housing and detachably mounted on said lamp housing and oscillatably movable thereon with respect to the optical axis of the lamp housing for adjusting the angle of picture projection, and a flexible drive connecting said motor with said combined motion picture camera and projecting apparatus in order to drive the latter when it is used as a projector, said flexible drive being removably attachable to said combined apparatus.

13. Motion picture equipment comprising, in combination, a relatively heavy stationary support, a motor mounted on said support, a relatively light and portable combined motion picture camera and projecting apparatus detachably mounted on said support and oscillatably movable thereon to change the angle of picture projection, said apparatus including a projecting lens system, a camera lens system, shutter and film moving mechanism, and means to drive the apparatus for camera use, and a flexible drive connecting said motor with said combined motion picture camera and projecting apparatus in order to drive the later for projector use, said flexible drive being removably attachable to said combined apparatus.

14. Motion picture equipment comprising, in combination, a relatively heavy stationary support, a motor mounted on said support, a relatively light and portable combined motion picture camera and projecting apparatus detachably mounted on said support for movement to change the angle of picture projection, said combined apparatus including a projection lens system, a camera lens system, shutter and film moving mechanism, and means to drive the apparatus for camera use, and a flexible drive element connecting said motor with said combined motion picture camera and projecting apparatus in order to drive the latter when it is used as a projector, said flexible drive element having one end removably attachable to said combined apparatus, said end having a clutch device adapted to be readily coupled to or decoupled from the aforesaid mechanism of said apparatus.

15. Motion picture equipment comprising, in combination, a relatively heavy stationary base or support, a lamp housing mounted on said support, an optical illumination system carried by said lamp housing, a motor mounted within and near the base of said support, a combined motion picture camera and projecting apparatus detachably supported by said support and including an optical projection illuminated by the aforesaid illumination system, and shutter and film moving mechanism, mechanical drive mechanism interconnecting the motor and the combined camera and projecting apparatus in order to drive the latter, said mechanism being removably attachable to said combined apparatus.

16. Motion picture equipment comprising, in combination, a relatively heavy stationary base or support, a lamp housing mounted on said support, an optical illumination system carried by said lamp housing, a motor mounted within and near the base of said support, a ventilating fan driven by said motor for cooling the lamp housing, a combined motion picture camera and projecting apparatus detachably supported by said support and including an optical projection system illuminated by the aforesaid illumination system, and shutter and film moving mechanism, mechanical drive mechanism interconnecting the motor and the combined camera and projecting apparatus in order to drive the latter, said mechanism being removably attachable to said combined apparatus.

FREEMAN H. OWENS.